March 21, 1967     R. I. BISHOP ET AL     3,309,923
AIRCRAFT INSTRUMENTS
Filed Nov. 18, 1963
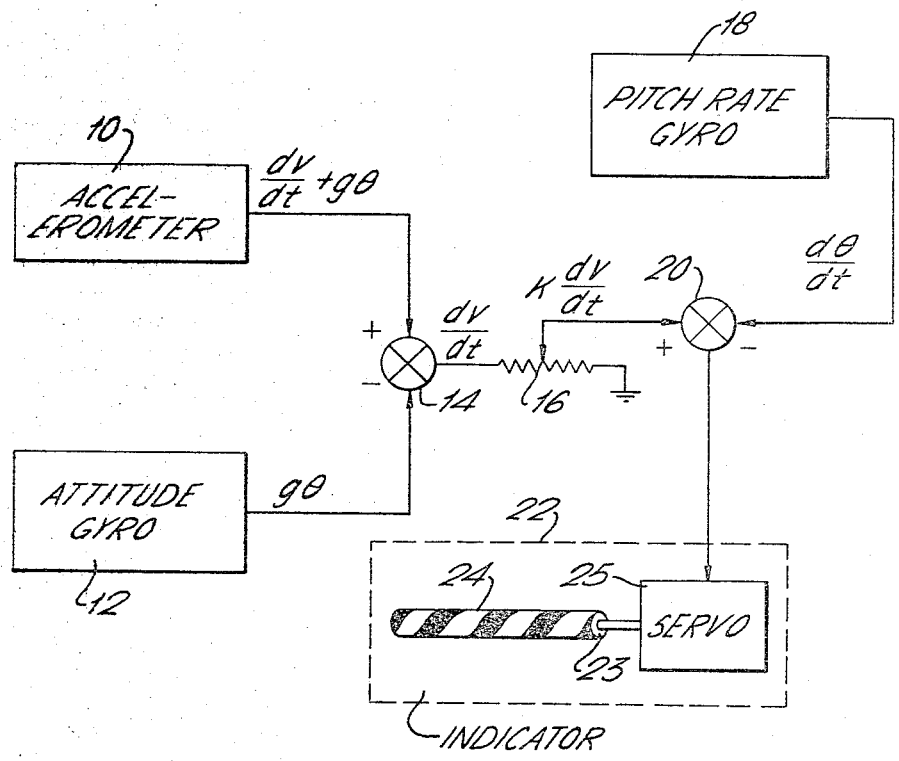
ROGER IVAN BISHOP
ERIC RAYMOND KENDALL
RUSSELL ARTHUR PALMER, Deceased.
by DAPHNE PALMER, Executrix
—Inventors
Hall, Pollock & Vande Sande
United States Patent Office 3,309,923
Patented Mar. 21, 1967

3,309,923
AIRCRAFT INSTRUMENTS
Roger Ivan Bishop and Eric Raymond Kendall, Cheltenham, England, and Russell Arthur Palmer, deceased, late of Cheltenham, England, by Daphne Palmer, executrix, Felixstowe, Suffolk, England, assignors to S. Smith & Sons (England) Limited, London, England, a British company
Filed Nov. 18, 1963, Ser. No. 326,654
Claims priority, application Great Britain, Nov. 20, 1962, 43,762/62
15 Claims. (Cl. 73—178)

The present invention relates to aircraft instruments.

It is becoming increasingly necessary to provide fast modern aircraft with instruments which are designed specifically to deal with certain critical flight maneuvers and which present to the pilot information regarding the action he must take. One such critical maneuver is that of take-off when (especially through the upwardly-curving, or flare-up, phase) the aircraft has to be handled with precision in order that the flight path shall be well above obstacles on the ground and yet not at any stage so steep that the aircraft fails to gain sufficient speed for safe flight. Economic considerations, particularly with jet aircraft, do not permit the use of liberal safety margins during take-off, and currently the pilot can rely only on his air speed and attitude displays to help him in the exacting task of achieving an acceptable flight path. The task of course becomes even more exacting if power loss or some other emergency condition arises.

It is an object of the present invention to provide an aircraft instrument and method that may be used especially to assist a pilot in achieving an acceptable flight path during take-off.

According to one aspect of the present invention an aircraft instrument comprises means for providing a signal dependent upon acceleration of the aircraft along its flight path, means for providing a signal deepndent upon rate of change of pitch attitude of the aircraft, and means which is arranged to be responsive to both signals for providing an indication which is dependent upon difference between said rate of change of pitch attitude and a function dependent upon said acceleration such that said indication is indicative of at least the sense of said difference.

The means for providing a signal dependent upon acceleration of the aircraft along its flight path may include an accelerometer. Where an accelerometer is used its arrangement may be such that it supplies a signal which has a first component dependent upon said acceleration and, inherently, a second component dependent both upon gravity and the pitch attitude of the aircraft. In this case the means for providing the signal dependent upon acceleration may include, in addition to the accelerometer, a pitch attitude unit for supplying a signal dependent upon gravity and the pitch attitude, and means arranged to be responsive to the signals supplied by the accelerometer and the pitch attitude unit to supply a signal which is dependent upon said first component but substantially independent of said second component of the accelerometer signal.

The means for providing a signal dependent upon rate of change of pitch attitude may be a pitch rate gyro.

The instrument may include means which is arranged to be responsive to the two signals dependent upon acceleration and rate of change of pitch to derive therefrom a signal dependent upon said difference, and an indicator which is arranged to be responsive to the difference signal to provide an indication of at least the sense of said difference. The indicator may include a rotatable member which is arranged to be rotated at a rate and in a sense dependent upon the magnitude and sense respectively of said difference. In this latter case the rotatable member may be a cylindrical member mounted for rotation about its longitudinal axis and having an optically distinct helical band coaxial therewith for providing an optical effect of movement at a rate and in a sense dependent respectively upon the rate and sense of rotation of the cylindrical member.

The invention is founded on the discovery that an acceptable flight path, especially during the upwardly-curving, or flare-up, maneuver, can be achieved by keeping to a law based on the equation:

$$d\theta/dt = KdV/dt \qquad (1)$$

where $\theta$ is the pitch attitude of the aircraft,
V is the velocity of the aircraft along its flight path,
K is a constant, and
t is time, $d\theta/dt$ and $dV/dt$ being respectively the rate of change of pitch attitude and acceleration along the flight path.

It has been found that if Equation 1 is used as a director law during take-off, that is to say if the rate of change of pitch of the aircraft is maintained in constant proportion to the acceleration along the flight path, throughout the upwardly-curving, or flare-up maneuver of take-off, a flight path which satisfies broadly safety and operational requirements is achieved. The method of take-off in accordance with the present invention using this equation has, in particular, been assessed by calculations covering variations in factors such as the total, all-up weight of the aircraft at take-off and the available propulsive thrust. In respect of calculations relating to one particular multi-engine transport aircraft, for example, consideration has been given to each of the combinations of circumstances that arise when the total weight is 100,000 lbs. or 160,000 lbs. and when all engines or all engines except one are operative. With each case the equation gives a satisfactory flight path with a satisfactory forward speed, a satisfactory margin to stall, and a satisfactory acceleration increment normal to the flight path, when a value of 0.003 or 0.004 is used for the constant K, the rate $d\theta/dt$ being in these circumstances expressed in radians per second and the acceleration $dV/dt$ in feet per second per second. Better speeds and speed margins are obtained, at the expense of lower flight paths, with the value 0.003 rather than 0.004 for the constant K. A lower value than 0.003 for the constant K gives an unduly low flight path under the conditions in which one engine is inoperative, and the total weight is 160,000 lbs., whilst under these conditions a higher value than 0.004 does not allow enough speed margin. The acceptable range for the constant K in the case of this one particular aircraft is thus established, and can equally well be established for other aircraft.

The aircraft instrument according to the present invention may be such that the said function dependent upon the acceleration of the aircraft is simply the product of said acceleration and a constant, the instrument as a result providing an indication which is indicative of the sense, and preferably also of the magnitude, of the difference between the rate of change of pitch and said function, so as thereby to demand change in pitch rate appropriate to bring the pitch rate into accordance with the direct law expressed by the simple Equation 1.

An aircraft instrument, and a method of controlling an aircraft in pitch during take-off, both in accordance with the present invention, will now be described, by way of example, with reference to the accompanying drawing which shows the instrument in schematic form.

Referring to the drawing, an accelerometer 10, which may be in the form of a pendulum mounted for angular displacement about an axis parallel to the pitch axis of the aircraft, supplies an electric signal dependent in amplitude upon the forward acceleration $dV/dt$ of the aircraft. The signal supplied by the accelerometer 10 is in fact representative of $(dV/dt + g \sin \theta)$, where $g \sin \theta$ is in this case an unwanted gravitational component which is inherently measured by the accelerometer 10. The gravitational component for small values of pitch angle $\theta$ is approximately equal to $g\theta$, and in order to remove this unwanted component a signal representative of $g\theta$ is derived from a pitch attitude gyro 12 and combined in a differential device 14 with the signal from the accelerometer 10.

The differential device 14 derives in response to the signals it receives from the accelerometer 10 and gyro 12 a signal which is representative in amplitude of the forward acceleration $dV/dt$ and which is substantially independent of the unwanted gravitational component $g \sin \theta$. This signal representative of the acceleration $dV/dt$ is applied across a potentiometer 16 so as to derive from the movable tap of the potentiometers 16 a signal representative of the function $KdV/dt$, where the value of the constant K is dependent upon the setting of the tap.

The instrument also includes a pitch rate gyro 18 which derives an electric signal representative in amplitude of the rate of change of pitch, $d\theta/dt$. This signal and the signal derived from the tap of potentiometer 16 are applied to a differential device 20 so as to derive a signal representative in magnitude and sense of the difference:

$$KdV/dt - d\theta/dt \qquad (2)$$

The difference signal derived by the differential device 20 is supplied to an indicator 22 which indicates the magnitude and sense of expression (2).

The indicator 22 is preferably an indicator of the general kind described in U.S. Patent No. 3,191,147, of A. M. A. Majendie, issued June 22, 1965, but may be a center-zero meter of conventional form. In the former case the indicator 22 may be specifically as described in U.S. Patent No. 3,085,429, of A. M. A. Majendie, issued April 16, 1963, and as represented in the present drawing, and include a cylindrical member 23 which is mounted for rotation about its longitudinal axis and which carries an optically distinct helical band 24 coaxial therewith as shown in FIGURE 2. The member 23 is rotated by a servo system 25 at a rate and in a sense dependent upon the magnitude and sense respectively of the difference signal so that the helical band 24 provides an optical effect of linear movement at a rate and in a sense dependent upon the difference given by expression (2).

When the instrument is used during take-off, the pilot controls the rate of pitch of the aircraft from lift-off with the object of maintaining at zero the value of expression (2) as this is indicated by the indicator 22. It will, of course, be understood by one skilled in the art that in effecting this maneuver the pilot will ordinarily control the rate of change of pitch by varying the pitch of the aircraft through manipulation of the elevators. In this method therefore the director law of Equation 1 is satisfied and a satisfactory upward-flared flight path for take-off is achieved throughout from lift-off. It will be understood that with the present instrument taking the pitch rate as measured by the pitch rate gyro 18, it is assumed that the aircraft is in the wings-level attitude throughout take-off.

We claim:

1. An aircraft instrument comprising means to provide a signal dependent upon a predetermined function of acceleration of the aircraft along its flight path, means to provide a signal dependent upon rate of change of pitch attitude of the aircraft, and means for continuously comparing said signals with one another to provide an output representative of any difference between said rate of change of pitch attitude and said function of acceleration, said last-named means including an indicator for providing an indication of said difference.

2. An aircraft instrument according to claim 1 wherein said function is a product of said acceleration and a constant.

3. An aircraft instrument according to claim 2 including adjustable means for varying selectively the value of said constant.

4. An aircraft instrument according to claim 1 wherein said means for providing a signal dependent upon acceleration of the aircraft along its flight path includes an accelerometer.

5. An aircraft instrument according to claim 1 wherein said means for providing a signal dependent upon rate of change of pitch attitude is a pitch rate gyro.

6. An aircraft instrument according to claim 1 including means responsive to the two signals dependent upon acceleration and rate of change of pitch to derive therefrom a signal dependent upon said difference, and an indicator responsive to the difference signal to provide an indication of magnitude and sense of said difference.

7. An aircraft instrument comprising means to provide a signal dependent upon acceleration of the aircraft along its flight path, means to provide a signal dependent upon rate of change of pitch attitude of the aircraft, means responsive to the two signals dependent upon acceleration and rate of change of pitch attitude to derive therefrom a signal dependent upon difference between said rate of change of pitch attitude and a function dependent upon said acceleration, and an indicator responsive to the difference signal to provide an indicator responsive to the difference signal to provide an indication of said difference, said indicator including a rotatable member, and means responsive to said difference signal to rotate said member at a rate and in a sense dependent upon the magnitude and sense respectively of said difference.

8. An aircraft instrument according to claim 7 wherein said rotatable member is a cylindrical member mounted for rotation about its longitudinal axis and having an optically distinct helical band coaxial therewith for providing an optical effect of movement at a rate and in a sense dependent respectively upon the rate and sense of rotation of the cylindrical member.

9. An aircraft instrument for use during take-off, comprising means for measuring acceleration of the aircraft along its flight path to provide a signal proportional to said acceleration, means for measuring the pitch rate of the aircraft to provide a signal proportional to said pitch rate, means for continuously comparing the two signals and providing an output signal representative of the sign and magnitude of any difference between them, and means connected to said comparing means for indicating the sign and magnitude of said difference.

10. An aircraft instrument comprising, means to provide a signal dependent upon acceleration of the aircraft along its flight path, means to provide a signal dependent upon rate of change of pitch attitude of the aircraft, and means responsive to both said signals to provide an indication which is dependent upon difference between said rate of change of pitch attitude and a function dependent upon said acceleration, said means for providing a signal dependent upon acceleration of the aircraft along its flight path comprising an accelerometer for supplying a signal which has a first component dependent upon said acceleration and, inherently, a second component dependent both upon gravity and the pitch attitude of the aircraft, a pitch attitude unit for supplying a signal dependent upon gravity and the pitch attitude, and means responsive to the signals supplied by the accelerometer and the pitch attitude unit to supply a signal dependent upon said first component and substantially independent of said second component of the accelerometer signal.

11. An aircraft instrument for providing an indication of deviation from a prescribed take-off flight path, comprising means for generating a first signal dependent upon acceleration of the aircraft along its flight path, means for generating a second signal dependent upon the rate of change of pitch attitude of the aircraft, means responsive to said first and second signals and producing an output representative of the difference in magnitude therebetween, indicator means, and means continuously coupling said output to said indicator means, said indicator means producing an indication representative of the difference in magnitude between the said first and second signals to thereby provide said deviation indication from the time of lift-off of the aircraft.

12. An aircraft instrument for providing an indication of deviation from optimum in the rate of change of pitch attitude of the aircraft throughout execution of an upwardly-flared maneuver, comprising means for generating a first signal dependent upon acceleration of the aircraft along its flight path, means for generating a second signal dependent upon the rate of change of pitch attitude of the aircraft, means responsive to said first and second signals and generating an output having at least one characteristic proportional to the difference in magnitude between the said first and second signals, indicator means, and means continuously coupling said output to said indicator means, said indicator means producing a representation of said characteristic of said output thereby to provide said deviation indication throughout the upwardly-flared maneuver of the aircraft.

13. A method of controlling an aircraft in pitch through a flare-up maneuver, said method comprising the steps of deriving continuously throughout the flare-up a first signal dependent upon forward acceleration of the aircraft, deriving continuously throughout the flare-up a second signal dependent upon the rate of change of pitch attitude of the aircraft, and throughout execution of said flare-up controlling the aircraft in pitch in accordance with both said signals to maintain continuously substantial equality between said rate of change of pitch attitude and a function dependent upon said forward acceleration.

14. A method according to claim 13 wherein said function is a product of said acceleration and a constant.

15. Apparatus for generating a signal which is continuously representative of the deviation in actual rate of change of pitch attitude of an aircraft from a prescribed rate of change of pitch attitude which is defined at each instant for said aircraft at least throughout that portion of its climb phase when its forwardly acceleration is varying comprising, means for generating a first signal which is representative of the forward acceleration of the aircraft, means for generating a second signal which is representative of the rate of change of pitch attitude of the aircraft, means having said first and second signals applied thereto and deriving a third signal representative of the difference in magnitude and sign between said first and second signals, utilization means, and means for continuously coupling said third signal to said utilization means at least throughout the period of varying forward acceleration of the aircraft.

References Cited by the Examiner

UNITED STATES PATENTS 3,200,642   8/1965   Neuendorf et al. _____ 73—178

LOUIS R. PRINCE, *Primary Examiner.*

D. O. WOODIEL, *Assistant Examiner.*